(12) United States Patent
Guarriello

(10) Patent No.: US 8,953,762 B1
(45) Date of Patent: Feb. 10, 2015

(54) TELEPHONE SYSTEM, APPARATUS, AND METHOD FOR PROVIDING ENHANCED PRIVACY FEATURES

(71) Applicant: Theodore J. Guarriello, Chambersburg, PA (US)

(72) Inventor: Theodore J. Guarriello, Chambersburg, PA (US)

( * ) Notice: Subject to any disclaimer, the term of this patent is extended or adjusted under 35 U.S.C. 154(b) by 0 days.

(21) Appl. No.: 13/945,646

(22) Filed: Jul. 18, 2013

(51) Int. Cl.
- H04M 1/56 (2006.01)
- H04M 15/06 (2006.01)
- H04M 3/42 (2006.01)
- H04M 3/38 (2006.01)

(52) U.S. Cl.
CPC ............ *H04M 3/38* (2013.01); *H04M 3/42365* (2013.01)
USPC ............. 379/142.05; 379/201.11; 379/211.02

(58) Field of Classification Search
CPC ..................... H04M 3/42042; H04M 3/42059; H04M 3/436; H04M 3/42
USPC ............. 379/142.01, 142.02, 142.05, 201.01, 379/201.11, 207.15, 210.02, 211.02
See application file for complete search history.

(56) References Cited

U.S. PATENT DOCUMENTS

| | | |
|---|---|---|
| 6,330,317 B1 | 12/2001 | Garfinkel |
| 6,741,688 B1 | 5/2004 | Yau |
| 6,853,717 B1 | 2/2005 | Frentz |
| 6,876,735 B1 | 4/2005 | Hill |
| 6,990,187 B2 | 1/2006 | MacNamara |
| 7,020,259 B2 | 3/2006 | Hussain |
| 7,027,569 B2 | 4/2006 | Price |
| 7,027,576 B2 * | 4/2006 | Schwab et al. ........... 379/201.11 |
| 7,136,472 B2 | 11/2006 | Hill |
| 7,212,620 B1 | 5/2007 | Mastro |
| 7,233,656 B2 | 6/2007 | Bedingfield, Sr. |
| 7,236,577 B2 | 6/2007 | Lection |
| 7,295,660 B1 * | 11/2007 | Higginbotham et al. ..... 379/196 |
| 7,352,855 B2 | 4/2008 | Bedingfield, Sr. |
| 7,359,499 B1 | 4/2008 | Frentz |
| 7,440,564 B2 | 10/2008 | Hill |
| 7,623,646 B2 | 11/2009 | Bedingfield, Sr. |
| 7,715,538 B2 | 5/2010 | Koch |
| 7,894,589 B2 | 2/2011 | Bedingfield, Sr. |
| 8,014,500 B2 * | 9/2011 | Chou ......................... 379/88.19 |
| 8,090,088 B2 | 1/2012 | Mullis |
| 8,315,368 B2 | 11/2012 | Koch |

(Continued)

OTHER PUBLICATIONS

"Call handling rules", May 2, 2013, 44 pages, user guide, Phone.com, http://www.phone.com/docs/Phone.com_guide_call-handling-rules.pdf.

*Primary Examiner* — Quoc D Tran
(74) *Attorney, Agent, or Firm* — IDP Patent Services; Olav M. Underdal

(57) ABSTRACT

A telephone system for enhanced privacy management includes a telephone switch, a rejected call handler, a user preference database, and an internet app privacy manager, whereby an incoming call can be assigned to a calling class, and routed according to a calling rule associated with the calling class. Using an interactive voice response menu or an application portal, the user can assign callers to calling classes and specify call handling rules and schedules. A rejected call handler includes a voice interface, a switch control, a voicemail, interactive voice response, call progress simulator, in-message options, in-call options, post-call options, and other components. Further disclosed is a method for determining a calling rule, including determining the caller id status, querying a calling rules table, and determining a calling rule.

23 Claims, 11 Drawing Sheets

(56) References Cited

U.S. PATENT DOCUMENTS

| | | |
|---|---|---|
| 8,363,803 B2 | 1/2013 | Gupta |
| 2002/0012426 A1 | 1/2002 | Gupton |
| 2007/0071212 A1 | 3/2007 | Quittek |
| 2007/0121871 A1 * | 5/2007 | Mullis et al. ............ 379/201.11 |
| 2007/0143422 A1 | 6/2007 | Cai |
| 2009/0052644 A1 * | 2/2009 | Wood et al. ............. 379/142.06 |
| 2009/0168755 A1 * | 7/2009 | Peng et al. ..................... 370/352 |
| 2011/0173697 A1 * | 7/2011 | Kurapati et al. ................ 726/22 |
| 2012/0309365 A1 | 12/2012 | Wang |
| 2013/0034223 A1 | 2/2013 | Koch |
| 2013/0095798 A1 | 4/2013 | Martin |

* cited by examiner

Telephone system for enhanced privacy management

Process for determining call handling

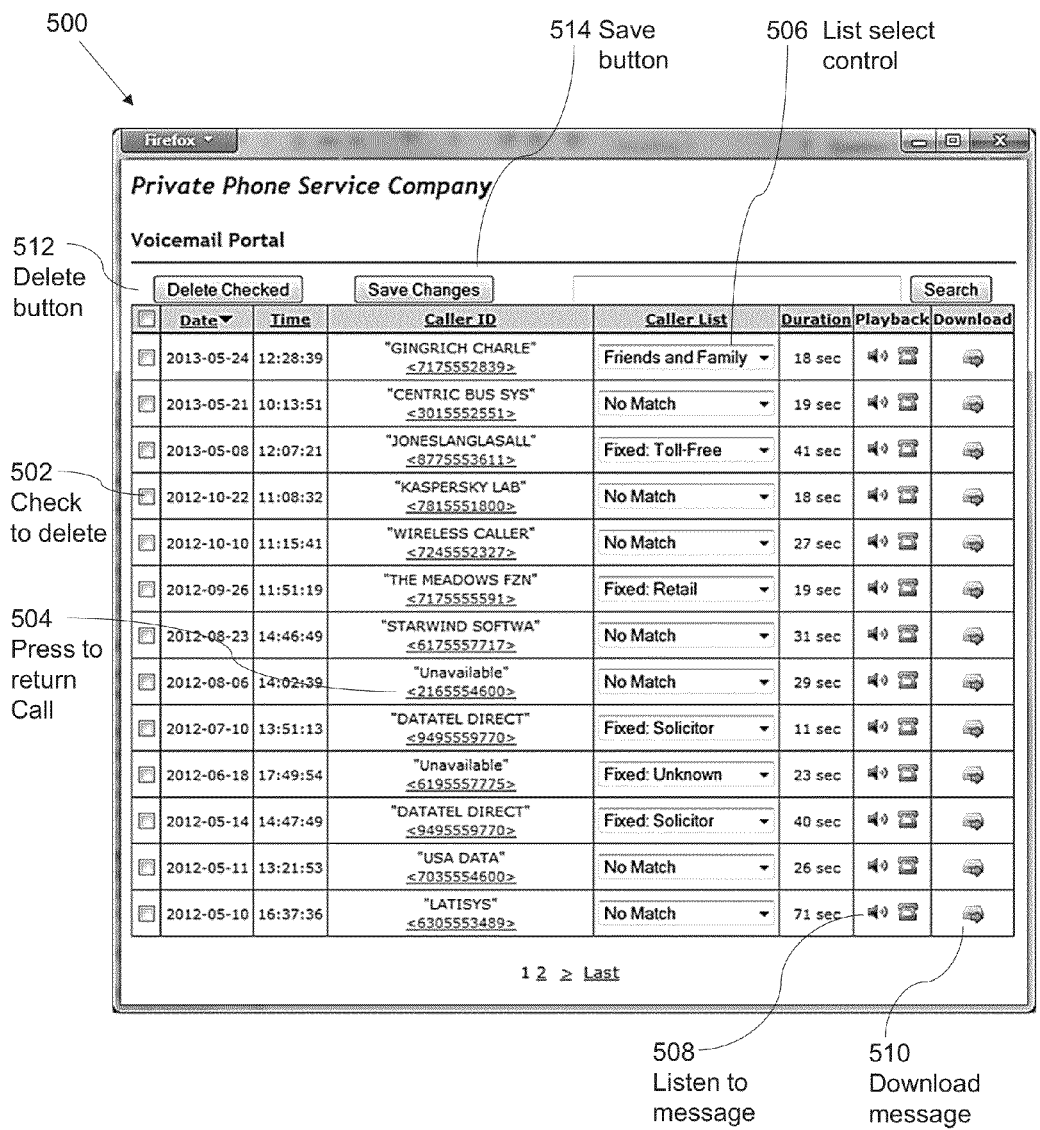

FIG. 6

Call detail record view

600

Private Phone Service Company

Call Detail Record

| Save | Start: 01/01/2013 | End: 05/24/2013 | | | | Search |
|---|---|---|---|---|---|---|
| Direction | Date▼ | Time | Caller ID | Caller List | Duration | Destination |
| Outbound | 2013-05-24 | 14:13:34 | <7175552839> | Friends and Family ▼ | 16 min | Answered |
| Inbound | 2013-05-24 | 12:28:39 | "GINGRICH CHARLE"<br><7175552839> | Friends and Family ▼ | 18 sec | Voicemail |
| Inbound | 2013-05-23 | 18:08:50 | "CHASE CREDIT"<br><8555552839> | Fixed: Spoofed ID ▼ | 18 sec | Rejected |
| Inbound | 2013-05-21 | 10:13:51 | "CENTRIC BUS SYS"<br><3015552551> | No Match ▼ | 19 sec | Voicemail |
| Outbound | 2013-05-13 | 16:05:21 | <4355553710> | Friends and Family ▼ | 8 sec | Busy |
| Outbound | 2013-05-11 | 09:23:12 | <6125559789> | Friends and Family ▼ | 4 min | Answered |
| Inbound | 2013-05-08 | 12:07:21 | "JONESLANGLASALL"<br><8775553611> | Fixed: Toll-Free ▼ | 41 sec | Voicemail |
| Inbound | 2013-04-22 | 11:08:32 | "KASPERSKY LAB"<br><7815551800> | No Match ▼ | 18 sec | Voicemail |
| Outbound | 2013-04-21 | 19:03:12 | <7145550127> | No Match ▼ | 4 min | Answered |
| Inbound | 2013-04-20 | 11:15:41 | "WIRELESS CALLER"<br><7245552327> | No Match ▼ | 27 sec | Voicemail |
| Outbound | 2013-04-20 | 11:15:12 | <7175555591> | Fixed: Retail ▼ | 6 min | Answered |
| Inbound | 2013-04-20 | 11:02:19 | "THE MEADOWS FZN"<br><7175555591> | Fixed: Retail ▼ | 19 sec | Voicemail |

1 2 3 4 5 ... ≥ Last

Call list view

Custom list view

FIG. 9

Call handling view

900

Private Phone Service Company

Edit Call Handling Schedule for: Friends and Family

| Del | Order | Start | | End | | Default Action | Action Specific Settings |
|-----|-------|-------|---|-----|---|----------------|--------------------------|
| 🗑 | ⬇ | FRI ▾ | 12:30P ▾ | SUN ▾ | 8:30P ▾ | Forward ▾ | TO: 717-555-1387 |
| 🗑 | ⬇⬆ | Weekdays ▾ | 5:30P ▾ | Weekdays ▾ | 7:30P ▾ | Send to Voicemail ▾ | ☐ Play SIT  ○ NoAns  ● Busy |
| 🗑 | ⬆ | Everyday ▾ | 10:00P ▾ | Everyday ▾ | 6:30A ▾ | Send to Voicemail ▾ | ☐ Play SIT  ○ NoAns  ● Busy |

[Add Schedule] [Save Schedule]

Calling rules table

FIG. 11

Global classes table

1100

| GID | CLID |
|-----|------|
| G1 | 6298290981 |
| G1 | 7178778924 |
| G2 | 7178778924 |
| G3 | 7178778924 |
| G1 | 8127839087 |
| G1 | 2157389052 |
| G1 | 6175239801 |
| G2 | 7145387620 |
| ... | |

TELEPHONE SYSTEM, APPARATUS, AND METHOD FOR PROVIDING ENHANCED PRIVACY FEATURES

CROSS-REFERENCE TO RELATED APPLICATIONS

Not applicable.

FIELD OF THE INVENTION

The present invention relates generally to the field of telecommunications and more specifically to privacy management for telephone calls.

BACKGROUND OF THE INVENTION

Unsolicited phone calls are an increasing problem for consumers. The National Do Not Call Registry was established with an intention of giving U.S. consumers an opportunity to limit the telemarketing calls they receive, but has in general not proven effective in limiting the number of unwanted phone calls received by consumers.

Currently, some telephone service providers offer very limited call blocking features that allow for blocking selected callers based on Caller ID. Lately, telemarketing callers are circumventing these filters using techniques such as Caller-ID spoofing and number rotation. Caller-ID spoofing is used for scamming purposes, for example to take advantage of elderly victims, or to have victims believe that they are receiving calls from their credit card company or financial institution. Additionally, the traditional "blacklist" can anger callers with malicious intent, placing stalked victims in greater danger.

The purpose of various aspects of this invention is to give a user complete control over how each incoming call is handled, in order to optimize telephone service privacy.

SUMMARY OF THE INVENTION

The foregoing needs are met, to a great extent, by the present invention, wherein in aspects of this invention, enhancements are provided to the existing model of privacy management of telephone calls.

In an aspect, the telephone system for providing enhanced privacy features consists of a set of computer-implemented features, placed into the call routing system of any voice or video calling system. The calling party is identified by a name or number issued by the caller's connection service, and provided to the called party, the user, whereby calls can be routed or handled based on the user's privacy desires. These features can be implemented independently or in any combination desired by the user, or the user's service provider, and can allows for granular end-user customized handling of incoming calls based on caller ID.

In a related aspect, the user can have complete control of how incoming call are handled, by allowing the user to define particular call handling rules, for different classes of callers.

In a related aspect, the system can provide global classes of callers, with predetermined call routing rules.

In a related aspect, the user can have access to assign callers to calling classes, during a call, after a call, or while listening to voicemail.

In a further related aspect, the user can edit the assignment of a caller to a calling class, via a touch-tone dialogue on the phone, or via an internet enabled application, executing on a laptop, smartphone, tablet, pc, or other computing device.

In a further related aspect, a caller can hear a simulation of call progression, for example simulating that the phone is ringing, even though the caller is not being connected to the user.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is an illustration of a voicemail portal graphical user interface, according to an embodiment of the invention.

FIG. 6 is an illustration of a call detail record graphical user interface, according to an embodiment of the invention.

FIG. 9 is an illustration of a call handling graphical user interface, according to an embodiment of the invention.

FIG. 11 is an illustration of a global classes table, according to an embodiment of the invention.

DETAILED DESCRIPTION

An embodiment of a telephone system for enhanced privacy management describes a computer-implemented system that can allow a user to implement granular privacy controls on incoming phone calls.

Throughout this disclosure the term 'class' or 'calling class', also referred to as a 'list' or 'calling list', shall be understood to represent a group of related caller identities that each has a common set of call handling rules. Classes can be implied, such as for examples the class of calls with toll-free originating North-American telephone numbers, or explicit such as for example a list of black-listed numbers or a list of white-listed numbers.

Throughout this disclosure the term 'rule' or 'calling rule' shall be understood to represent a predetermined call routing process that is applied to the call once it's class has been established. A calling rule can be a user or service provider selectable call handling process.

Figure 1:
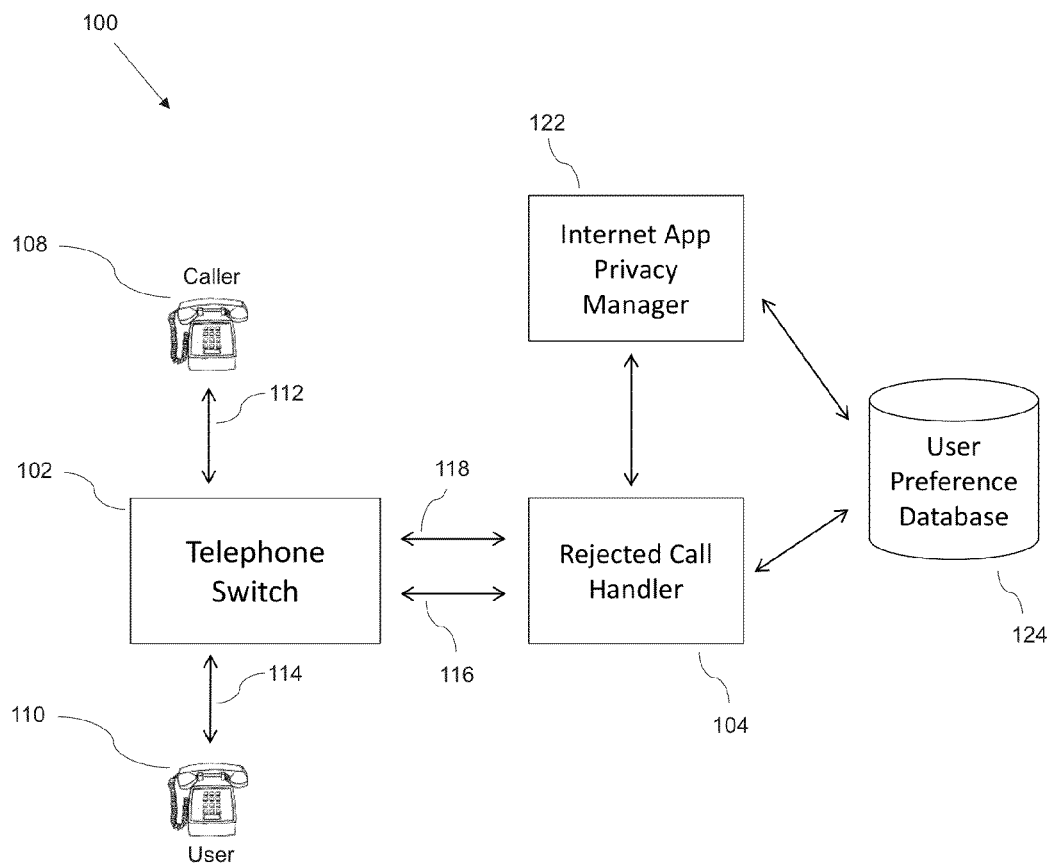
FIG. 1 is a schematic diagram illustrating a telephone system for enhanced privacy management, according to an embodiment of the invention.

In the following we describe the structure of such an embodiment in the form of a computer-implemented system with reference to FIG. 1, in such manner that like reference numerals refer to like components throughout; a convention that we shall employ for the remainder of this specification.

In an embodiment, a telephone system for enhanced privacy management 100 can include:
- a. A telephone switch 102, including a carrier grade switch or gateway, a Voice Over IP switch, A Cellular/Mobile Switching Center and/or a soft switch;
- b. A rejected call handler 104 for processing calls routed from the telephone switch 102, wherein control commands can be communicated via a control communication channel 116, and media traffic, including phone calls, audio, video, messaging, and other real-time communications, can be transferred via a media communication channel 118, and set-up and customization of call handling rules can be controlled via a touch tone dialogue;
- c. An internet app privacy manager 122, which can control the set-up of calling rules via a computer-implemented application, and can control functions on the rejected call handler 104;
- d. A user preference database 124, which stores the calling rules and other user preferences, established by the rejected call handler 104 and the internet app privacy manager 122;
- Whereby a telephone call from a caller 108, can be handled by the rejected call handler 104 via calling rules defined in the user preference database 124, by a user 110.

Figure 2:
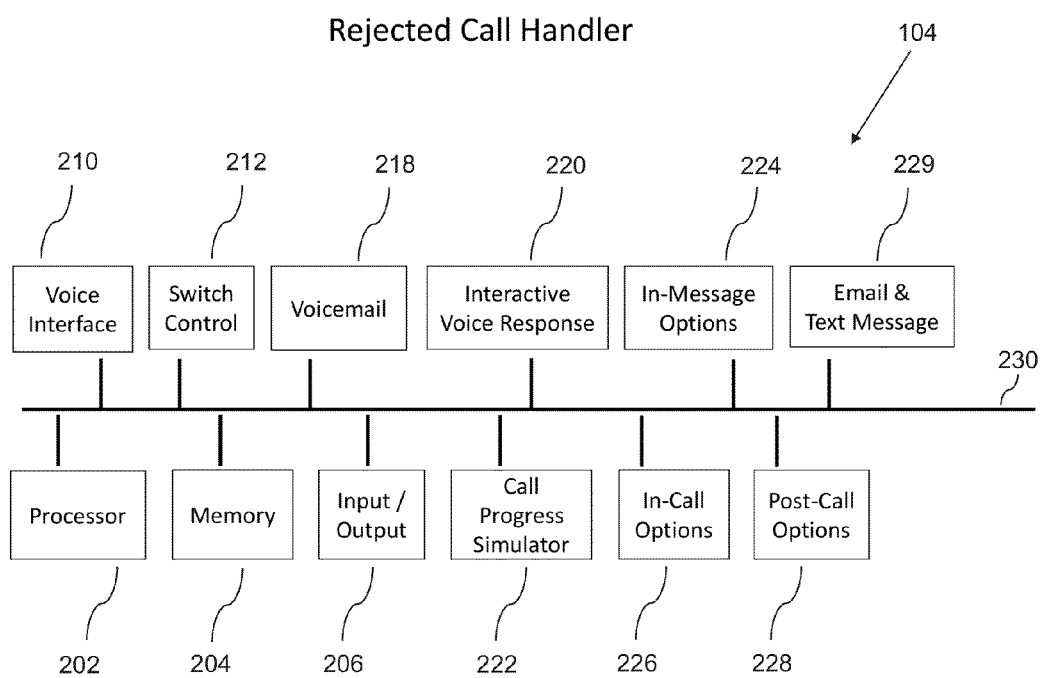
FIG. 2 is a schematic diagram illustrating a rejected call handler, according to an embodiment of the invention.

In a related embodiment, as illustrated in FIG. 2, the rejected call handler 104, can include:
- a. a processor 202,
- b. memory 204,
- c. an input/output 206,
- d. a voice interface component 210,
- e. a switch control component 212,
- f. a voicemail component 218,
- g. an interactive voice response component 220,
- h. a call process simulator 222,
- i. an in-message options component 224,
- j. an in-call options component 226,
- k. a post-call options component 228, and
- l. an email and text message component 229;
- m. wherein all of these components are connected via a data bus 230.

In a related embodiment, the user preference database 124 can provide storage for user account information, calling rules, privacy settings and messaging data. Specifically, the user preference database 124 can contain a calling rules table, a table, or tables, of Dialed Number (DID) and Caller ID (CLID) pairs along with an action, an alternate phone number and effective start and end times of the action.

Figure 10:
FIG. 10 is an illustration of a calling rules table, according to an embodiment of the invention.

In a related embodiment, shown in FIG. 10, a calling rules table 1000 can include the following fields:
- a. DID, the dialed number;
- b. CLID, the dialing or originating number, commonly referred to as the Caller ID;
- c. Priority, the priority of the calling rule, which can be employed to select the applicable calling rule, when several calling rules match an incoming phone call;
- d. HndlRule, which identifies the calling rule to be applied;
- e. FwdDID, a forwarding phone number;
- f. StartTime, a starting time for which the calling rule applies; and
- g. EndTime, an ending time for which the calling rules applies.

In a related embodiment, the telephone switch 102 can query the user preference database 124 directly to obtain a call handling rule, or alternatively, the rejected call handler 104 can provide the call handling rule to the switch by look-up in the user preference database 124 and communication over the communication channel 116.

In an embodiment, the rejected call handler 104 can include the voice interface component 210, which allows the system to communicate via the media communication channel 118 with the telephone switch 102 and handle calls. The rejected call handler 104 can thereby handle all calls that are not directly connected to the call receiving user 110. Any call that is not to be sent to the caller can be forwarded to this system for processing. The rejected call handler 104 can determine the correct action for each call by querying Dialed Number (DID) and caller ID (CLID) pairs from the user preference database 124 and processing the returned calling rule. All results of actions taken by the rejected call handler 104 can be logged and stored in the user preference database 124 for access by the other components.

In a further related embodiment, by providing the rejected call handler 104 as an add-on to an existing switching infrastructure, at least the following can be accomplished:
- a. the existing switching infrastructure requires only firmware modification to allow communication with the database or the API provided by this module; and
- b. The capacity of the incumbent switch is not reduced by the new, complex call handling features. Allowed calls can still be passed to the end user while the rejected call handler processes unwanted calls. This system may optionally be responsible for enforcement of end-user delinquency and service suspension.

Figure 3:
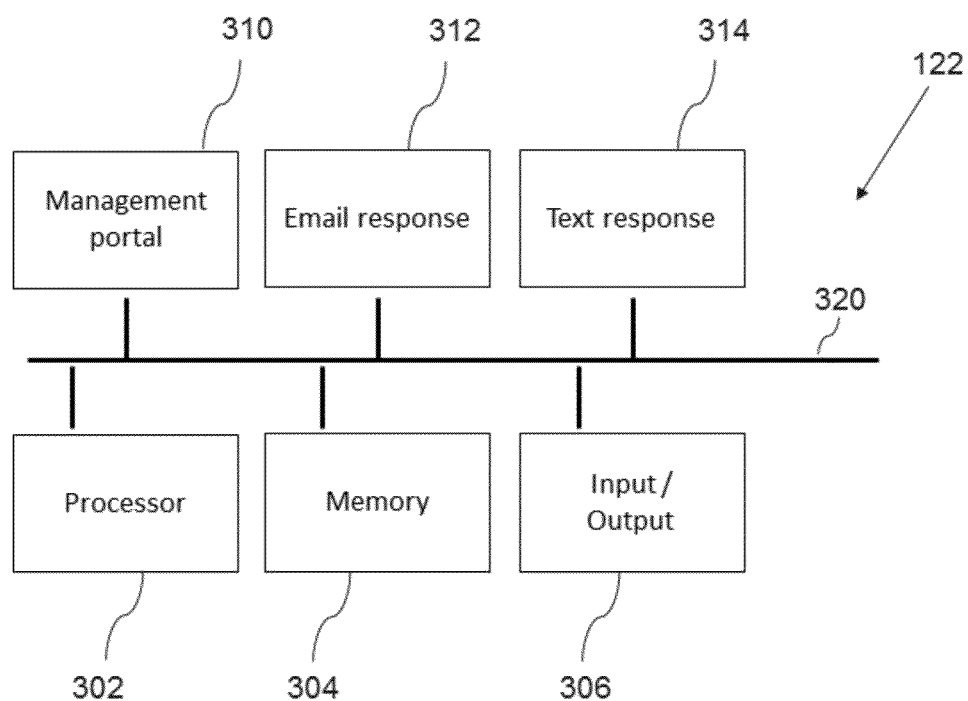
FIG. 3 is a schematic diagram illustrating an internet app privacy manager, according to an embodiment of the invention.

In a further related embodiment, as illustrated in FIG. 3, the internet app privacy manager 122, can include a processor 302, a memory 304, an input/output 306, a management portal component 310, an email response component 312, and a text response component 314.

It shall be understood that the above-mentioned components of the rejected call handler 104 and the internet app privacy manager 122 are to be interpreted in the most general manner. For example, the processor 202 and the processor 302, can each respectively include a single physical microprocessor or microcontroller, a cluster of processors, a datacenter or a cluster of datacenters, a computing cloud service, and the like. In a further example, the memory 204 and the memory 304, can each respectively include random access memory and other forms of temporary storage, and hard disks, hard disk clusters, cloud storage services, and other forms of permanent storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the rejected call handler 104 and the internet app privacy manager 122 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

In a related embodiment, upon receiving a call from the caller 108, the telephone switch 102 can query the user preference database 124 either directly or by proxy via the rejected call handler 104, for the calling rule action to be taken by either respectively the telephone switch 102 or the rejected call handler 104, as specified by the calling rule for the CLID/DID pair, found by lookup in the calling rules table 1000, located in the user preference database 124.

The query can return either no data, in which case a default calling rule can be used, or it can return one or more records; each containing an action, an optional alternate phone number and optional start and end times. Subsequently, if control has been passed to the rejected call handler 104, the rejected call handler 104 can determine the specific action to be taken by the switch based on the current time and to pass that to the switch. If the direct-query method is used, the telephone switch 102 can process all records and execute the specified action.

In a further related embodiment, once the action has been established, the switch can then process the call in at least one of the following ways:
   a. Attempt to ring the end-user phone applying the traditional set of call features, such as call waiting, call forwarding, etc., and optionally pass the call to the voicemail component 218 of the rejected call handler 104, in the event of busy or no answer.
   b. Reject the call by passing it directly to the rejected call handler 104.
   c. Reject the call due to delinquency disconnect.
   d. Forward the call to an alternate party based on the alternate party number returned by the query.

In a related embodiment, traditional switch call-flow processing can preempt the end-user desired action. For example, the call forward feature of a standard telecom switch might take precedence over the query/action procedure. This is a matter of service provider preference and switch programming.

In a further related embodiment, when the rejected call handler 104 receives a call from the telephone switch 102, it can query the user preference database 124 for the CLID/DID action records, or retrieve the information from cache in the memory 204. In some further related embodiments, the rejected call handler 104 can subsequently query the user preference database 124 again for specific call progress information.

In a further related embodiment, once a call is completed and call progress data is properly stored in the user preference database 124, the rejected call handler 104 can, via the email and text message component 229, send an email or text message alert regarding a message left by the caller.

In a further related embodiment, a specific class of callers can be identified by a discrepancy between the caller's actual PSTN origination switch and the PSTN home switch of the caller's provided identification. Such a discrepancy is also referred to as 'Caller ID spoofing'. Recognition of this discrepancy can identify intentionally deceptive callers.

In a related embodiment, the telephone system for enhanced privacy management 100 can become increasingly accurate at handling calls according to user desires with increased system usage, whereby:
   a. Callers can be grouped into calling classes defined by flexible lists, each list can be a user-defined list or a globally available list.
   b. A list can be defined by the rule in which calls from all callers in the list will be handled, so that:
      i. Global lists such as telemarketers, Unknown Callers, Toll-Free Numbers, etc. The global lists can be created by the service provider and can be fine-tuned over time based on information gathering and/or end user feedback. As an example, a caller number may be added to the Telemarketer list based on the fact that a threshold of users have classified the caller as such, or new legislation may call for registration of activities allowing for the lookup of the caller's intent. FIG. 11 shows an example of a global classes table 1100, contained in the user preference database 124.
      ii. User-Defined lists such as friends and family, Black-List, Grey-List, etc., which are created by the user. In some cases, addition to the list may be automatic, such as whitelisting any number that the caller calls first or blacklisting any caller that the caller chooses to blacklist using an in-call or in-message calling options.

In a further related embodiment, global calling classes can be provided in an initial state by the service provider, from which initial state they can be further manipulated by the end user. End user activity (adding or removing caller from their global list) can be monitored and used to enhance accuracy of the list for all users:
   a. Telemarketer
   b. Pollster
   c. Retail Solicitor
   d. Other Solicitor
   e. Known Scammers
   f. Blocked Caller ID
   g. Unknown Caller ID
   h. Toll-Free Caller ID
   i. Spoofed Caller ID
   j. Pre-Paid Cell Phone
   k. Default Action (Caller not on any list)

In a related embodiment, a call handling rule can describe the way a caller is treated after dialing the end user. A calling class can be defined by the rule in which any caller in the calling class will be handled, when attempting to call the end user. Calling rules can include:
   a. Allowing the call to ring through in the traditional manner and optionally go to voicemail if busy or unanswered.
   b. Simulation of Busy or Away (i.e.: call rings or goes directly to voicemail without ringing the end-user device).
   c. Simulated Ringing with no answer without ringing end user device
   d. Simulated Busy Signal without ringing user device.
   e. Forward to alternate destination immediately or after ringing end user device a selectable number of times.
   f. Rebounding the call to the caller's own telephone number.
   g. Playing a user-customizable message and hanging up.
   h. Play a stock message provided by the service provider.
   i. Any calling rule can optionally be preceded by a Special Information Tone (SIT) to foil predictive dialers.

In a related embodiment, rules can be applied to call classes based on time and date. For example, the user 110 can choose to send all toll-free numbered calls to voicemail during evening hours or forward calls from family to his cell phone during work hours.

In a related embodiment, the calling rules can further include a default rule, wherein the default rule can be applied to all calls that are not specifically identified in established classes. For example, all calls from unknown callers can be played a SIT tone and sent to voicemail.

In a related embodiment, any calling rule can be associated with an 'alert me' feature, which can direct the rejected call handler 104 to send a notification via email or text message that a caller on the list has called.

In a related embodiment, calling classes can be prioritized to allow end users to determine how callers that may be related to multiple classes will be treated. As an example, and end user may choose to prioritize the allowance of retail solicitor calls above the blocking of telemarketers, causing retail solicitors to ring through to the phone even though they are also on the blocked caller list. In another example, the end user can choose to prioritize blocking of spoofed Caller IDs as a high priority, to avoid receiving calls from potential scammers.

In a related embodiment, multiple calling rules can be applied to each calling class based on time schedules. For example, an end user may choose to automatically forward calls from friends and family to his/her cell phone during work hours and ring through to home phone during home times—or the user may choose to block telemarketers at evening mealtime. This scheduling can be fully flexible, allowing the end user to choose between two or more calling rules for each list based on a time schedule.

In a related embodiment, the call progress simulator 222 of the rejected call handler 104 can implement a feature that causes a caller to experience a familiar call flow, without disturbing the end user. As an example, the caller can be played a ring tone for 30 seconds and then be sent to voicemail without ever ringing the end-user phone. This will make the caller think that the end user is away. Alternately, the caller can be played a busy signal or be sent directly to voicemail to simulate the user being on the phone. These can be strategically employed to avoid receiving calls from certain predetermined callers without angering them.

In a related embodiment, a call rebound rule can route a caller to be immediately forwarded to the caller's own Caller ID. This rule can be used to indicate to a persistent, unwanted caller that their call is not welcome and that they are being intentionally rejected.

In a related embodiment, end user classes can be defined and maintained solely by a user. The user can add and remove callers from the classes, or create and delete lists using a control function, provided as phone call interaction via the rejected call handler 104, or application interaction via the internet app privacy manager 122. User functions can include:

a. In-call class assignment, processed by the in-call options component 226 of the rejected call handler 104, which can allow the user to press a key on a phone device, such as a touch-tone key on a telephone, to add the caller's Identity to a caller class and to optionally disconnect the call. For example, hitting the # key may cause the caller to be added to a class whose rule is to always ring busy in the future, while hitting * may add the caller to a class that is always sent to voicemail in the future. The in-call class assignment may or may not include a feature that plays an informative message to the Caller if the call is immediately disconnected from the user's device.

b. Post-call class assignment, processed by the post-call options component 228 of the rejected call handler 104, wherein after a call is completed the user may dial a code, or enter a menu system, allowing him/her to add or remove the last caller to/from a list. This menu system can also be used to set up all features of the privacy service using spoken commands or touch-tone (DTMF) dialing.

c. In-message class assignment, processed by the in-message options component 224 of the rejected call handler 104, which can allow the user to add or remove a caller respectively to or from a class, while listening to messages left in their voicemail. As an example, pressing # during the message playback can cause the caller to be added to a class whose rule is to always ring busy in the future while hitting * may add the caller to a class that is always allowed to ring through to the Users device in the future.

d. Automatic class assignment, wherein the user may choose to have all outgoing dialed calls added to a class. This can be used to "whitelist" or allow callers who dial from numbers that the user has called.

e. An application portal, processed by the management portal component 310 of the internet app privacy manager 122, wherein the user can logon to his or her using account to control all aspects of the privacy control system. User can manipulate list contents, create or delete lists, provide feedback on global lists and set up priority, calling rules and schedules for each list. The application portal also allows the end user to review all previous calls in a report that provides action buttons that the end user can use to add, remove or move callers in lists. The application portal also allows the review of voicemail, providing the user with a means to listen to, download and organize messages left by callers.

f. A smart-device including smart-phone and smart-TV applications, processed by the management portal component 310 of the internet app privacy manager 122, wherein the application portal can execute on smartphones, mobile devices and Smart-TV operating systems, giving the end user full command over privacy management. Additionally, this allow for the review and management of voicemail messages and can be used to enunciate current callers in real-time, for example showing caller ID on TV when a call rings the user's phone.

g. Data upload and download, processed by the management portal component 310 of the internet app privacy manager 122, the web portal and/or Smart Device portal can upload and download list data. This is a convenience for those who would like to manipulate data in a text or spreadsheet document or to upload a contact list from an address book.

h. Email and text messaging, wherein when a caller leaves a message on the voicemail component 218 of the rejected call handler 104, the end user can opt to be alerted by email or mobile text message, processed by the email and text message component 229, and to optionally have the message audio and/or video delivered with the message for review. Email messages will contain links allowing to end user to add or remove the caller to/from a list with a click. Likewise, a set of response commands can be used allowing the end-user to respond to the TXT message with a code to add or remove the caller to/from a list. As an example, a caller may respond to a text message voicemail alert with a "*1" telling the system to add the caller to list number 1.

Figure 7:
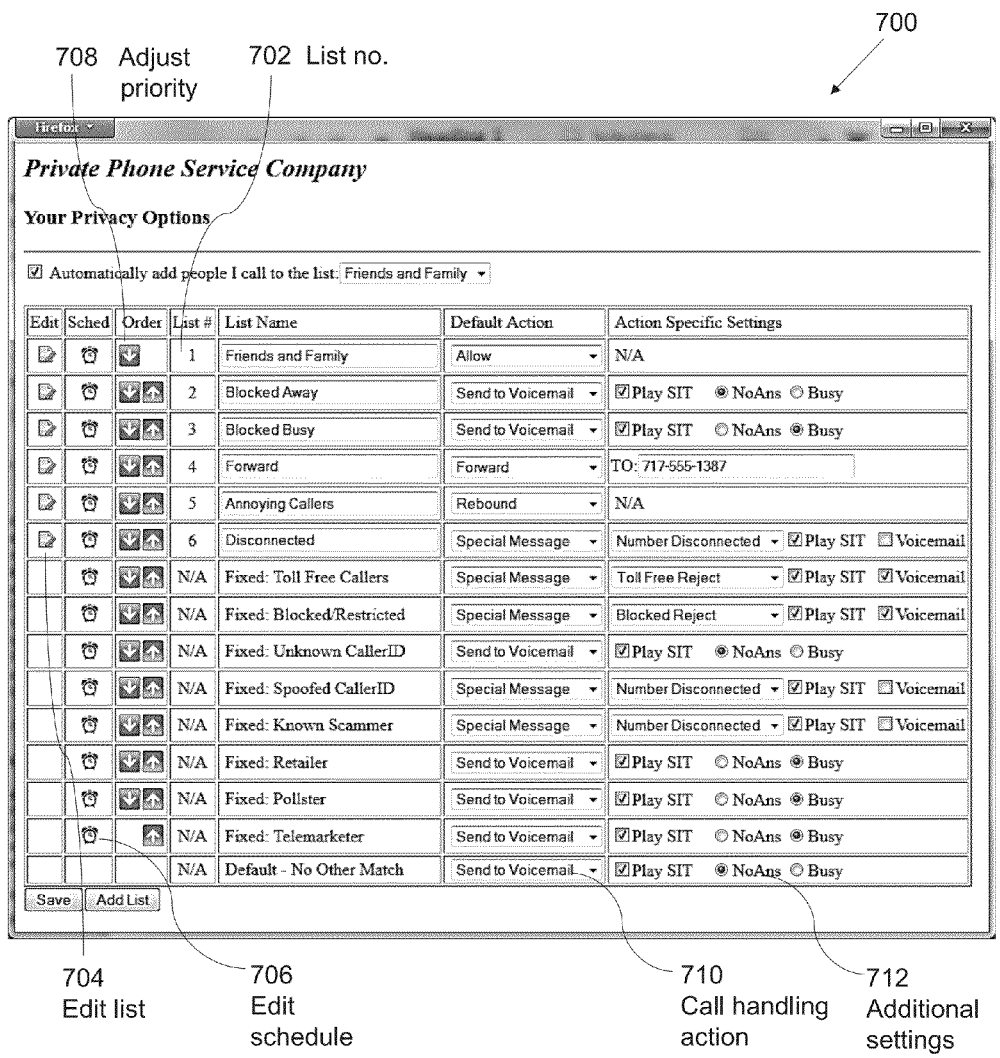
FIG. 7 is an illustration of a call list graphical user interface, according to an embodiment of the invention.

FIG. 7 illustrates an example embodiment wherein the management portal component 310 of the internet app privacy manager 122 can be configured as a web portal or smart device application that can provide a simple interface for a user to set up privacy features. In this example, a table of aggregated custom and global caller lists is displayed. Custom lists can be created by the user and given a name. Fixed lists, also referred to as global calling classes, are those lists that are based on Caller ID attributes, such as Toll-Free number, or are maintained by the service provider, such as the class or list of known scammers. The default action is a pseudo-list provided to allow the user to specify how to handle calls that do not match any other list.

In a related embodiment, a priority order set of buttons 708 can allow the user to set the order in which the lists will be evaluated. The purpose for this is to allow the user to specify which action to take in the event that a caller exists on more than one list.

In a related embodiment, a List no. 702 can be provided for the purpose of linking a custom list to a push-button action on the user's phone during in-call, post-call and in-message activity. For example, a user may choose to push #5 during a call to add a caller to List #5, wherein list #5 could as an example be the 'Annoying Caller' list. Alternatively, the user could choose to push #1 while listening to a voicemail message, to add a caller to List #1, which for example could be the 'Friends and Family' list.

In a related embodiment, a setting can be provided for each list that allows the user to set the default action 710 to be taken, when a call comes in from a caller on any list. A dynamic, action-specific settings area can automatically provide additional settings 812 specific to the action selected for each list.

Figure 8:
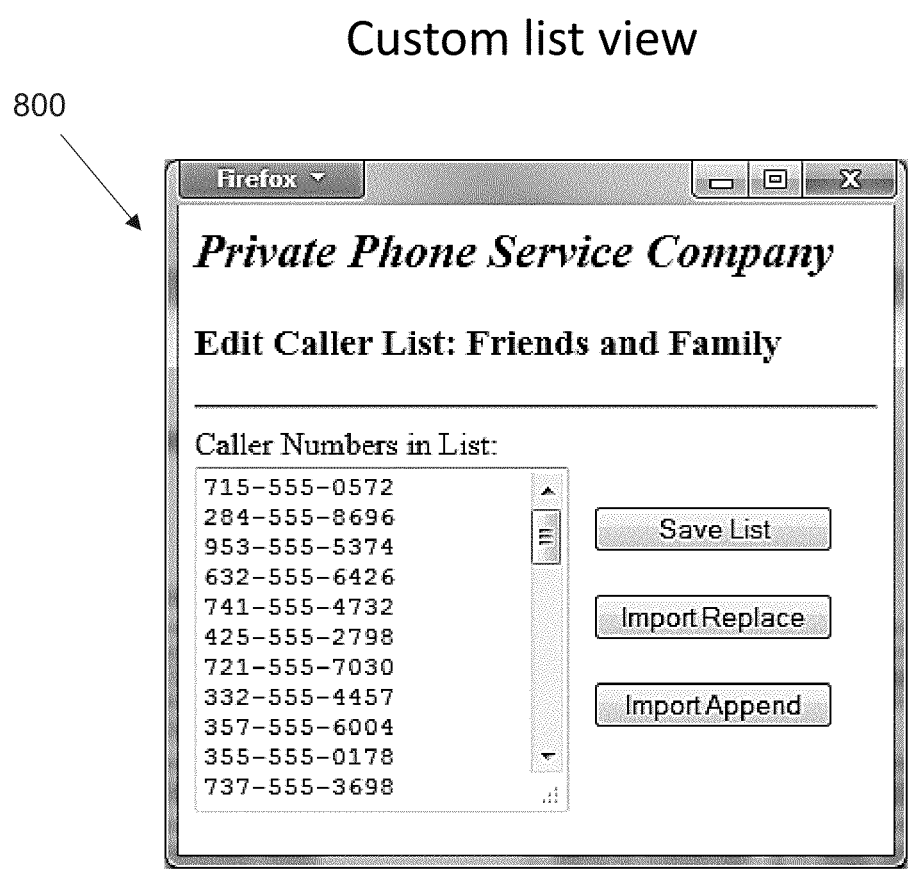
FIG. 8 is an illustration of a custom list graphical user interface, according to an embodiment of the invention.

In a related embodiment, illustrated in FIG. 8, each of the user's custom lists can be edited. Using a 'popup window' or an alternate page, the caller lists can be manually edited or an external list, such as a spread sheet, text document, contact list or address book, can be imported and either replace the current list or be appended to it.

In a related embodiment, illustrated in FIG. 9, schedules can be created for alternate actions to be performed at different times of day. Complex call handling schedules can be created, allowing the user to create different levels of privacy at different times of day for each list. In this example, the user does not want to be bothered by the callers on list 'Friends and Family' overnight or during the evening meal time period. In this example, the user is also forwarding calls from this group to a different number from Friday through Sunday.

In a related example embodiment, FIG. 5 illustrates a voicemail web portal or smart device application that can allow additional control over privacy settings. A common calling rule for handling those callers that are not yet classified is to send them to voicemail. The voicemail portal provides a simple method of reviewing the callers that have left messages and adding them to any desired calling list. The portal can also provide the ability to delete messages 502, return the call 504, play the message on the browsing device 508, or download the message 510 to the browsing device as a standard digital media file.

In a related embodiment, when first opened, the caller list select box 506 can be set to lowest priority list of which the caller is a member, or to "No Match", if it is currently not on any known list. The user can select a new list to which the caller should be added. If a change is made, the change is applied when the delete 512 or save button 514 is pressed.

In a further related embodiment, shown in FIG. 6, the call detail record web portal or smart device application can allow similar review of calls and placement of callers into lists. All inbound and outbound calls are logged and the user is given a choice of lists for each caller.

In a related embodiment, an interactive voice response (IVR) menu can be provided by the interactive voice response component 220 of the rejected call handler 104, allowing the user to adjust privacy settings directly from any telephone device. The IVR menu can be entered by either dialing a feature code on the user phone or by entering remotely through the voicemail component 218. The voicemail component 218 can offer the remote access by allowing the user to enter the menu system by pressing a key, such as for example '*', while listening to the voicemail greeting and optionally entering a PIN code for security purposes.

In a related embodiment, IVR choices can be made using touch-tone buttons or voice commands using a voice recognition system.

In a related embodiment, the IVR menu can include:
a. A set of menu options for the voicemail component 218 plus in-message privacy options:
  i. Listen to, navigate and delete messages
  ii. Record Greetings
  iii. Change/Set Personal passcode (PIN)
  iv. Return Call to the caller
  v. Add caller to a caller ID list in the privacy system
b. A set of menu options for privacy system settings can include:
  i. Review custom caller lists, wherein the user can get an overview of currently customized caller lists. Table 1 shows an example of such a dialogue.

TABLE 1

" Callers on list 1 will be allowed to call normally.
Callers on List 2 will be sent to voicemail with SIT Tone after ringing.
Callers on List 3 will be sent to voicemail with SIT Tone immediately.
Callers on List 4 will be forwarded to 7-1-7-5-5-5-1-3-8-7
Etc . . . "

ii. Adding a caller to a list, including:
    1. Adding the most recent caller
    2. Adding a new number that the user enters
  iii. Removing a caller from a list, whereby
    the user can enter the number to be removed and the system enumerates the lists on which the number exists. The user can then choose one, several or all of the lists from which the number is to be removed.
  iv. Changing a call handling rule, whereby
    the user can select a list number, the system walks the user through a call handling rules setup menu and applies the new user preferences to the selected list.
  v. Creating a new list with associated call handling rule, whereby user can interact with a call handling rule setup menu and create a new custom list using the first unused list number. The user can be informed of the new list number for future reference.
  vi. Deleting a list, whereby
    the interactive voice response component 220 prompts the user for the list to be removed and asks for verification. The interactive voice response component 220 then removes information about the list from the preferences database. The list number either becomes available for reuse, or is filled by renumbering the higher-numbered lists.

vii. Adjusting call handling rules for special, global or default lists, whereby the interactive voice response component 220 prompts the user for the caller category that he/she would like to work on. An example is shown in Table 2.

TABLE 2

"Please select the special caller list that you would like to change from the following options.
Press 1 for Toll-Free numbers,
Press 2 for Unknown Callers,
Press 3 for Blocked or Restricted Callers,
Press 4 for Telemarketers . . . "

After the user selects a valid option, the system walks the user through the call handling rule setup menu and applies the user choices to the selected category.

In a further related embodiment, a call handling rule setup menu can be established as shown in Table 3.

TABLE 3

"Please select how you would like callers on this list to be handled:
1—Allow calls to ring normally
2—Send calls to voicemail
3—Forward the call to an alternate number
4—Play a pre-recorded message
5—Rebound the call to the Caller's phone number
6—Reject call"

In relation to the above embodiment, if the user selects option 2, the dialogue can proceed as follows:

TABLE 4

"Would you like to pretend you are away by playing 4 rings to the caller before answering?
Press 1 for Yes or 2 for No"
"Would you like to precede your voicemail greeting with a SIT Tone to discourage auto-dialers?
Press 1 for Yes or 2 for No."
"Which voicemail Greeting would you like to play to the caller?
Press 1 for your normal greeting or 2 through 5 for custom greetings. All greetings can be recorded using the voicemail menu"

In relation to the above embodiment, if the user selects option 3, the dialogue can proceed as follows:

TABLE 5

"Please enter the number to which you would like to forward calls."

In relation to the above embodiment, If the user selects option 4, the dialogue can proceed as follows:

TABLE 6

"Please select a message from the following options. After selecting, the message will be played for you. After the message is played, you will be given the option to use it or to choose another.
1—Number has been disconnected
2—Toll Free Reject
3—Blocked Reject
4—etc . . . "
"Would you like to play a SIT tone before the message?
Press 1 for Yes or 2 for No"
"Would you like to send the caller to Voicemail after the message?
Press 1 for Yes or 2 for No"
If Yes: "Which voicemail greeting would you like to play to the caller?

TABLE 6-continued

Press 1 for your normal greeting or 2 through 5 for custom greetings. Custom greetings can be recorded using the voicemail menu"

In relation to the above embodiment, if the user selects 6, the dialogue can proceed as follows:

TABLE 7

"How would you like the call to be rejected?
Press 1 for busy, 2 for Fast-busy or 3 for ringing with no answer"

Figure 4:
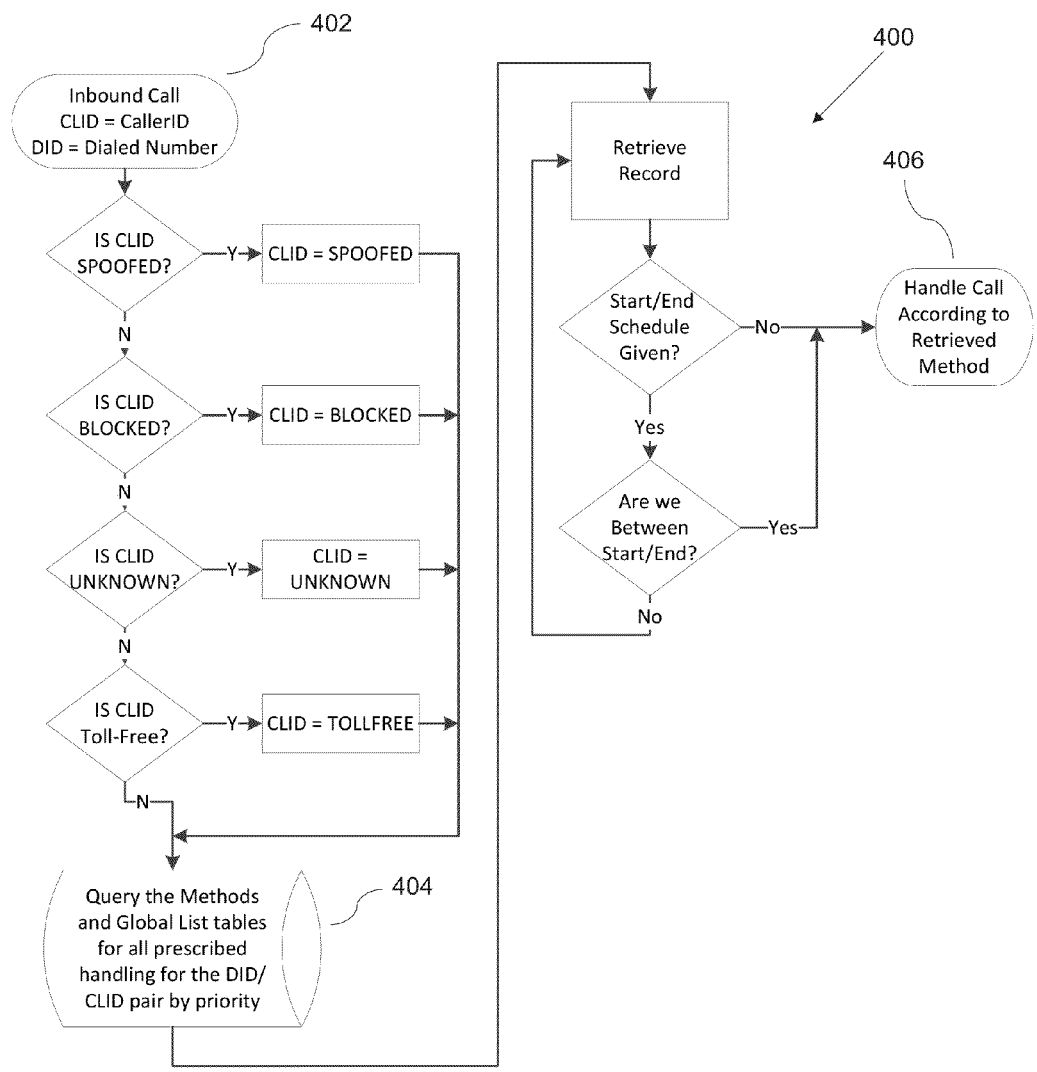
FIG. 4 is a flowchart illustrating steps that may be followed, in accordance with one embodiment of the method or process of determining call handling for enhanced privacy management.

In a related embodiment, a process or method for determining a call handling rule, as shown in FIG. 4, can include:
a. Determining the caller id status 402 for a call, where the caller id status can further include:
i. caller id is spoofed;
ii. caller id is blocked;
iii. caller id is unknown or unavailable;
iv. caller id is toll-free;
b. Querying a calling rules table 404 to retrieve a call handling rule
c. Handling the call 406 according to the retrieved call handling rule.

In a related embodiment, an example SQL Query used to query a calling rules table, shown in FIG. 10, and thereby determine the calling rule defining a specific calling action, can be defined as follows:

TABLE 8

SELECT HndlRule, FwdDID, StartTime, EndTime
FROM Rules
LEFT JOIN GlobalLists on Actions.CLID = GlobalLists.GID
WHERE Rules.DID = '{DID}'
AND (Rules.CLID = '{CLID}'
OR GlobalLists..CLID = '{CLID}'
OR Rules.CLID = 'Default')
ORDER BY Rules.Priority ASC In a further related example embodiment, referencing an example calling rules table 1000, a query based on a caller 717-877-8924 calling our end user at 202-555-1212 would result in the following list of prioritized actions. The CLID exists in Global List G2 at priority 7 and in the end user's custom list at priority 3. As such, the call will be forwarded to 615-827-0946 between Saturday at 8:00 AM and Sunday at 2:30 PM, otherwise it will be allowed to ring through to the end user's device. The last record, which becomes the default record, will never be evaluated in this case because one of the records with a lower priority index will always be true.

FIGS. 1, 2, 3, and 4, are block diagrams and flowcharts methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 2 and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include random access memory (RAM) and read-only memory (ROM). The computer also may include nonvolatile storage memory, such as a hard disk drive, where additional data can be stored.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the telephone system for enhanced privacy management 100. The rejected call handler 104 can be configured to operate as a software program inside the telephone switch 102. In a further example, all the component of the telephone system for enhanced privacy management, can be defined to execute within the telephone switch 102, supported by a sufficient application programming and runtime execution environment, such as for example provided by advanced contemporary programmable telephone switches and media gateways. Alternatively, the rejected call handler 104 can be separated in a call processing component and an application processing component.

Many such alternative configurations are readily apparent, and should be considered to be fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A telephone system for enhanced privacy management comprising
    a. a telephone switch; and
    b. a rejected call handler, further comprising a switch control component;
    wherein the rejected call handler transfers media traffic via a media communication channel, connecting the telephone switch with the rejected call handler, and the rejected call handler communicates control commands via a control communication channel, connecting the telephone switch with the rejected call handler; whereby an incoming call from a caller to a user is managed according to predetermined calling rules;
    wherein the switch control component controls the handling of calls by the telephone switch, according to the calling rules, wherein the switch control component is further configured to include processing of a call rebound rule, whereby a call from a caller is forwarded back to the caller's own caller id.

2. The telephone system for enhanced privacy management of claim 1, further comprising a user preference database, wherein the rejected call handler stores and retrieves the calling rules in the user preference database.

3. The telephone system for enhanced privacy management of claim 2, wherein the rejected call handler is further comprising an interactive voice response component, wherein the interactive voice response component controls touch-tone based privacy rule set-up processing, and stores the results of the users selections in the user preference database.

4. The telephone system for enhanced privacy management of claim 2, further comprising an internet app privacy manager, wherein the internet app privacy manager stores the results of user selections in the user preference database, and the internet app privacy manager controls functions provided by the rejected call handler.

5. The telephone system for enhanced privacy management of claim 1, wherein the media traffic further comprises a telephone call.

6. The telephone system for enhanced privacy management of claim 1, wherein the media traffic further comprises a video call.

7. The telephone system for enhanced privacy management of claim 2, wherein the user preference database further comprises a calling rules table, whereby the rejected call handler obtains information about calling rules applicable to an incoming phone call.

8. The telephone system for enhanced privacy management of claim 1, wherein the rejected call handler communicates with the telephone switch via the control communication channel, to detect that the caller identification from the caller's origination switch is not equal to the caller identification from the PSTN home switch, whereby the caller is identified as potentially deceptive.

9. The telephone system for enhanced privacy management of claim 4, wherein the internet app privacy manager, processes information about an incoming phone call, received from the rejected call handler, whereby the application presents information and call handling options to the user related to the incoming phone call.

10. A rejected call handler comprising
    a. a processor;
    b. a memory;
    c. an input/output;
    d. a voice interface component; and
    e. a switch control component;
    wherein the voice interface component connects media traffic from an external telephone switch the switch control component controls the handling of calls by the external telephone switch, according to calling rules stored in the memory, wherein the switch control component is further configured to include processing of a call rebound rule, whereby a call from a caller is forwarded back to the caller's own caller id.

11. The rejected call handler of claim 10, further comprising a voicemail component, wherein the voicemail component is configured with a voicemail function for incoming calls, received via the voice interface component of the rejected call handler.

12. The rejected call handler of claim 10, further comprising an interactive voice response component, wherein the interactive voice response component controls the processing of an interactive voice response menu.

13. The rejected call handler of claim 10, further comprising a call progress simulator, wherein the call progress simulator is configured to simulate processing of a call flow of an incoming call, received via the voice interface component of the rejected call handler.

14. The rejected call handler of claim 11, further comprising an in-message options component wherein the in-message options component processes commands from a user, received via the voice interface component of the rejected call handler, during reading of voicemail via the voicemail component, whereby the user assigns a calling class to the calling number associated with a voicemail.

15. The rejected call handler of claim 10, further comprising an in-call options component, wherein the in-call options component processes commands from a user, received via the voice interface component of the rejected call handler, during an in-coming phone call, whereby the user assigns a calling class to the calling number of the incoming phone call during the call.

16. The rejected call handler of claim 10, further comprising an email and text message component, wherein the email and text message component sends an email or text message to a user related to an incoming call.

17. The rejected call handler of claim 10, further comprising a post-call options component, wherein the post-call options component processes commands from a user, received via the voice interface component of the rejected call handler, after conclusion of an in-coming phone call, whereby the user assigns a calling class to the calling number of the incoming phone call after the call has completed.

18. A method for determining a calling rule, comprising
    a. determining the caller id status for a call received via a telephone switch;
    b. querying a calling rules table in a user preference database, to retrieve a calling rule; and
    c. processing the call according to the retrieved calling rule, wherein the processing includes processing of a call rebound rule, whereby a call from a caller is forwarded back to the caller's own caller id.

19. The method for determining a calling rule of claim 18, wherein the processing of the call further comprises assigning a calling number of the call to a calling class, during of the call.

20. The method for determining a calling rule of claim 18, wherein the processing of the call further comprises assigning a calling number of the call to a calling class, after the call.

21. A rejected call handler comprising
    a. a processor;
    b. a memory;
    c. an input/output;
    d. a voice interface component;
    e. a switch control component; and
    f. a call progress simulator
    wherein the voice interface component connects media traffic from an external telephone switch; the switch control component controls the handling of calls by the external telephone switch, according to calling rules stored in the memory; and the call progress simulator is configured to simulate processing of a call flow of an incoming call, received via the voice interface component of the rejected call handler, wherein the simulated processing of the call flow includes a caller being played a ring tone and then being sent to voicemail without ringing an end-user phone, whereby the caller will think that the end-user is away.

22. The rejected call handler of claim 21, wherein the switch control component is configured to process a call rebound rule, whereby a call from a caller is forwarded back to the caller's own caller id.

23. The telephone system for enhanced privacy management of claim 1, wherein the rejected call handler, further comprises a call progress simulator, wherein the call progress simulator is configured to simulate processing of a call flow of an incoming call.

* * * * *